United States Patent [19]

Ohba

[11] 4,347,803
[45] Sep. 7, 1982

[54] DISPLAY DEVICE PROVIDING MAGNIFIED INDICATION

[75] Inventor: Masaharu Ohba, Toyota, Japan

[73] Assignee: Toyota Jidosha Kogyo Kabushiki Kaisha, Aichi, Japan

[21] Appl. No.: 177,584

[22] Filed: Aug. 13, 1980

[30] Foreign Application Priority Data

Oct. 26, 1979 [JP] Japan .................. 54-149092[U]

[51] Int. Cl.³ .................................. G09F 9/00
[52] U.S. Cl. ............................. 116/28.1; 74/10.7; 74/473 SW
[58] Field of Search ............. 116/28.1, 20; 74/10.7, 74/473 SW, 96

[56] References Cited

U.S. PATENT DOCUMENTS 3,602,187  8/1971  Lambiris ........................ 116/28.1

Primary Examiner—Robert I. Smith

Attorney, Agent, or Firm—Birch, Stewart, Kolasch & Birch

[57] ABSTRACT

A display device for displaying an indication of a quantity, such as the shift range to which an automatic transmission is set, having an indicator member mounted so as to rotate within a first range of rotational movement around a first axis, and a drive member which is rotated around a second axis, different from the first axis, within a second range of rotational movement through an angle corresponding to the quantity to be indicated. The drive member is engaged with the indicator member so as to drive the indicator member, with a point of engagement between the drive member and the indicator member describing a locus, as the drive member and the indicator member move through their ranges of rotation, the perpendicular distance from any point on which to the first axis is shorter than the perpendicular distance from the point to the second axis.

8 Claims, 3 Drawing Figures

DISPLAY DEVICE PROVIDING MAGNIFIED INDICATION

BACKGROUND OF THE INVENTION

The present invention relates to a display device, and, more particularly, relates to a display device for displaying, by the movement of an indicating member, the value of some quantity. Such a display device is particularly well adapted for display of the transmission shift range in which an automatic transmission fitted to a vehicle is set.

In automobiles which are equipped with automatic transmissions which are controlled by a controlling shift lever mounted upon a steering column outer tube, so that by the use of this selecting lever the automatic transmission may be selected between, for example, "L", "2", "D", "N", "R" and "P" ranges, it is well known for an indicating device or dial type indicator to be fitted and coupled to the movement of said controlling shift lever, so as to indicate to the operator of the vehicle in what range the transmission is set. Such a display device is usually fitted on the upper side of a steering column which is located in a slanting orientation in the vehicle, so that the display device is upwards and to the front of the steering column outer tube, from the point of view of the driver. In other words, such a display device is located in the direction towards the instrument panel of the vehicle from the steering column outer tube. This is a good location to allow for easy viewing of the display device by the driver, during operation of the vehicle.

Conventionally, such an automatic transmission range display device is provided with an indicator member, which is rigidly coupled to the aforesaid shift lever which is used for shifting said automatic transmission between its various speed ranges, and which is pivoted around its own axis. Cooperating with this indicator member, a display plate inscribed with symbols denoting shift ranges, such as "L", "2", "D", "N", "R", and "P", is arranged, so that the indicator member of the display device indicates one of these range symbols, in order to show to the driver in which shift range the automatic transmission is currently set and operating. Thus, as the transmission is shifted between its various shift ranges by use of the selecting lever, i.e., as this lever is rotated around its axis, the indicator member moves between these shift range indicating symbols on the display plate. Therefore, according to the rotational position of the indicator member, one or another of these symbols is picked out.

In a display device, generally, it is preferable that the symbols indicated by an indicating member of the display device should be arranged sufficiently far apart to be easily picked out, even from quite a distance, by the operator of a vehicle or other device to which the display device is fitted. That is to say, if the symbols on the display device are located too close together, in other words, if the range of movement of the indicating member between the various positions which it is capable of assuming is too small, then it will be difficult to read the display device.

The distances between various indicating symbols which are designated by different positions of an indicator member which rotates about an axis are proportional, both to the angles through which the indicator member is rotated about said axis, and to the distance from said axis of the portion of the indicator member which is brought proximate to said indicating symbols. Thus, in order to increase the distance between said symbols, it is desirable either to increase the angle through which the indicator member is moved, or to increase the length of the indicator member from said axis. However, since in a conventional indicating device, as described above, the indicator member is directly driven by the selecting lever or control shaft, therefore the rotational angle through which this indicating member is moved is limited to be the same as the angle through which this selecting lever is moved, and in the case of an automatic transmission is limited by the construction of the automatic transmission and of the linkage of the selecting lever thereto. Further, in an actual vehicle, the range of motion through which said selecting lever may be moved is often quite limited, since otherwise the selecting lever may interfere with other parts of the vehicle, or with the body of the driver.

Therefore, the angle through which such an indicator member may be moved may well be rather restricted. In order to obtain good separation of the indicating symbols on such a display device, therefore, it is desirable to increase the length between the axis of such an indicator member, around which is rotates, and the portion of the indicator member which is brought proximate to the various indicating symbols. However, because of the general positioning in automobiles of a steering column outer tube as obliquely upright and close to the front of a vehicle, and because of the convenience of positioning such a display device forward and upward of the steering column outer tube, the space available for such a display device is much restricted, and it may not be possible to increase the effective radius of an indicator member, i.e. the distance between the axis of rotation of said indicator member and the tip thereof which is proximate to said indicating symbols of the display device. Therefore a difficulty has arisen with aforesaid prior art display device constructions, in that, because the various indicating symbols thereof are necessarily located rather close together, they are small and hard to read, especially in poor lighting conditions.

This problem is particularly acute in cab-over type, i.e. foward-control type, automobiles and trucks, in which the driver is seated very close to the front of the vehicle, and the steering column outer tube is oriented nearly vertically, so that there is very little room in front of said steering column outer tube, between it and the dash panel of the vehicle. Especially in such vehicles, the indicator member cannot be made very lon, due to the restricted space available for the display device. Thereby, the intervals between the various transmission range indicating symbols are reduced to such an extent that it is very difficult to distinguish between them.

SUMMARY OF THE INVENTION

From consideration of the above outlined shortcomings in conventional display devices, especially in display devices for indicating the selected shift range of an automatic transmission in a vehicle, a principal object of the present invention is to provide an improved display device, which is capable of responding to displacements of a driving member through a relatively small rotational angle, and which is fairly compact, and yet which provides adequate separation of indicating symbols thereon, so that these symbols may be easily read, and so that it may be easily distinguished which of them is indicated by an indicating member of the display device.

Another object of the present invention is to provide an improved selected shift range display device for vehicles, especially for forward control type vehicles.

A further object of the present invention is to provide such a display device, as described above, which is cheap and simple to manufacture.

Yet another object of the present invention is to provide such a display device, as described above, which is reliable and free from mechanical troubles during operation.

These and other objects are accomplished, according to the present invention, by a display device for displaying an indication of a quantity, comprising: an indicator member, which rotates within a first range of rotational movement around a first axis; and a drive member, which rotates around a second axis, different from said first axis, within a second range of rotational movement, through an angle corresponding to said quantity. Said drive member is engaged with said indicator member so as to drive said indicator member; and a point of engagement between said drive member and said indicator member describing a locus, as said drive member and said indicator member move through their respective ranges of rotation, the perpendicular distance from any point on which to said first axis is shorter than the perpendicular distance from said point to said second axis.

According to such a construction, since at all times the distance between said point, on the locus, where the indicator member is engaged to the drive member, and the first axis, is always shorter than the distance between said point of engagement and the second axis, thereby, as the drive member is rotated and drives the indicator member, the indicator member is, necessarily, driven through a greater rotational angle about the first axis, than the angle of driving rotation of the driving member about the second axis. Accordingly, a magnified angle of rotation for the driven indicator member is provided around said first axis, compared to the rotating angle of the driving member about said second axis, according to the ratio of the above described distances, and, accordingly, because the rotating angle of the indicator member is greater than would be the case if the indicator member were merely rigidly coupled to the drive member, thereby, for a given length of indicator member, the movement of its extremity is greater, and accordingly can be more easily seen by an operator. If a part of said indicator member is arranged so as to cooperate with indicating symbols, therefore, these indicating symbols can be spaced a greater distance apart, and accordingly it may be more easily distinguished by an operator which symbol is being indicated by the indicator member.

This improvement in performance has been accomplished without making the indicator member longer, and, accordingly, without making the display device substantially more bulky. Therefore, the display device according to the present invention may be fitted within approximately the same space as the prior art devices outlined above, and accordingly may be conveniently fitted to vehicles for display of selected shift range, and especially may be fitted to forward control type vehicles.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. In the drawings.

DESCRIPTION OF THE PREFERRED EMBODIMENTS

Figure 1:
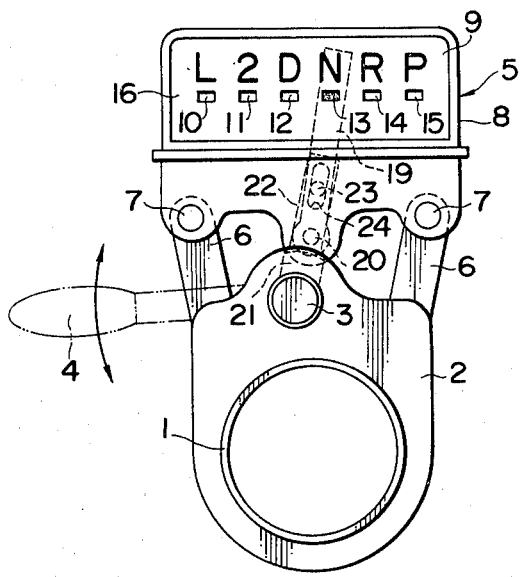
FIG. 1 is a plan view of a display device which is a first embodiment of the present invention, and which is an embodiment which is constructed as a device for displaying the shift range selected in an automatic transmission mechanism in an automobile, seen from above from approximately the point of view of a vehicle operator seated at a steering wheel of the vehicle.

Referring to the drawings, 1 designates a steering column outer tube, which is mounted in the automobile in a generally semi-upright position, and to the upper end of this steering column outer tube 1 there is attached an upper bracket 2, which has a lobe generally protruding on its side towards the front of the automobile, i.e. in the upward direction in FIG. 1. Towards the front of the automobile from the steering column outer tube 1 there is mounted a shift range select lever shaft 3, parallel to the steering column outer tube 1, and the lower end (not shown) of this select lever shaft 3 is connected via a per se well known linkage to a control member of an automatic transmission, while the upper end of this select lever shaft 3 is rotatably supported by the bracket 2. A shift range select lever 4, which is shown by phantom lines in FIG. 1 because it is in fact longer relative to the display device than is shown in the drawing, is fixedly connected to the select lever shaft 3, and thus the shaft 3 is rotatably driven by this select lever 4, as the extreme end of the lever 4 is moved up and down in FIG. 1, as indicated by the arrows, so as to change the selected shift range of the automatic transmission.

A selected shift range indicating assembly 5, which is a preferred embodiment of the display device according to the present invention, is mounted towards the front of the automobile from the steering column outer tube 1 and the shift range select lever shaft 3, as seen in FIG. 1, so that symbols on the indicating assembly 5 may be clearly visible to the driver of the automobile, when he is seated in the driver's seat and grips the steering wheel which is mounted on the upper end of the steering column. This indicating assembly 5 comprises a generally box shaped indicating assembly housing 8, to which are attached, by two mounting screws 7, two mounting arms 6, the other ends of which are attached to the aforesaid protruding lobe of the upper bracket 2.

Figure 2:
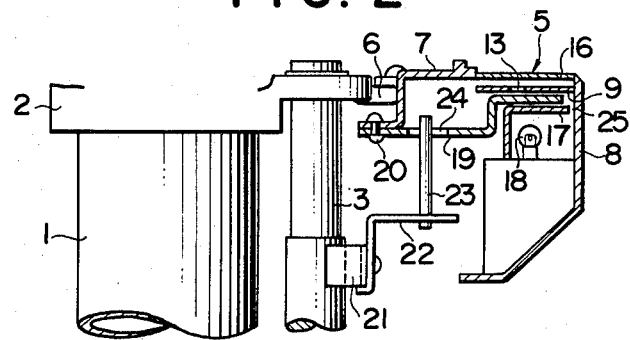
FIG. 2 is a part sectional view through the display device shown in FIG. 1, taken along a plane which contains the axes of a steering column outer tube and a shift range select lever shaft, so as to show the internal construction of the display device.

The detailed construction of the indicating assembly 5 may be more clearly seen in FIG. 2, which is a partial cross section taken along the plane which contains the axis of the steering column outer tube 1 and the axis of the transmission range select lever shaft 3. A non transparent symbol display board 9 is mounted within the indicating assembly housing 8, and on this symbol display board 9 are printed indicating symbols. In this embodiment, six selected shift range indicating symbols, "L", "2", "D", "N", "R", and "P" are arranged along a generally horizontal line, with certain intervals between them, across the field of view of a driver seated in the driver's seat. Further, underneath these selected transmission shift range indicating symbols, "L", "2", "D", "N", "R", and "P", there are provided, respectively, shift range indication apertures 10, 11, 12, 13, 14, and 15, which are pierced through the symbol display board 9, and each of which corresponds to its relative indicating symbol.

Over the top of the symbol display board 9 there is mounted a transparent upper cover 16, so as to prevent the ingress of dust, dirt, oil, or other contaminants into the inside of the indicating assembly 5, and below the symbol display board 9 there is mounted a light shield element 17, so as to form a generally light tight box, with a light source 18 contained therein, a certain part of the light generated within this light tight box by the light source 18 being allowed to escape, around the light shield element 17, via a light transmitting gap 25 formed between the right edge in FIG. 2 of the light shield element 17 and the indicating assembly housing 8, so as to illuminate the symbol display board 9 from below in a generally diffused fashion. Further, a certain part of this illuminating light produced by the light source 18 penetrates to illuminate the upper surface of the symbol display board 9, via the light transmitting gap 25, around the symbol display board 9 and through a gap between the left edge of the symbol display board 9 in FIG. 2 and the upper portion of the indicating assembly housing 8. Thereby, the symbols "L", "2", "D", "N", "R", and "P" may be illuminated, so as to be seen by the driver, in low light conditions.

The left hand part in FIG. 2 of the indicating assembly housing 8 pivotally supports one end of an indicating arm member 19, via a pivot pin 20, around an axis which is coplanar with the axis of the steering column outer tube 1 and the axis of the transmission range select lever shaft 3, and which is substantially displaced forward toward the front of the automobile from the axis of the select lever shaft 3. Thus the plane of movement of the indicating arm member 19 is perpendicular to the axis of the outer tube 1 and to the axis of the select lever shaft 3. The free end of the indicating arm member 19 remote from the axis of its pivot pin 20 is located between the symbol display board 9 and the light shield element 17, and is so arranged that it may be selectively aligned and coincided with any one of the six shift range indicating apertures 10, 11, 12, 13, 14, or 15, so that a portion of the indicating arm member 19 may be seen through said selectively aligned aperture by the driver of the automobile. To this end, it is preferred that the upper surface of the indicating arm member 19 should be painted or colored with a different color from the color of the upper surface of the light shield element 17, so that it may be easily distinguished therefrom, when said upper surface of the indicating arm member 19 is visible through one of the range indicating apertures 10–15. A certain amount of illumination from the light source 18 will, as a matter of course, penetrate to illuminate the upper surface of the indicating arm member 19, via the aforesaid light transmitting gap 25, in an indirect fashion.

On the transmission range select lever shaft 3 there is fixed a mounting element 21, to which is fixed an indicating arm drive member 22, said drive member 22 thereby being rotated along with the shaft 3 as the shift range select lever 4 is moved. To the drive member 22 there is mounted a drive pin 23, which projects generally upward in FIG. 2, and which thus rotates together with the shaft 3 around the axis of the shaft 3 as the shift range select lever 4 is moved. This drive pin 23 engages in an elongated drive slot 24, which is formed in an intermediate portion of the indicating arm member 19. Thus, particularly according to the present invention, throughout both the range of movement of the assembly consisting of the shift range select lever shaft 3, etc., and that of the indicating arm member 19, the distance from the point of engagement of the drive pin 23 and the indicating arm member 19 (this point moves to and fro along the elongated drive slot 24), to the axis around which the indicating arm member 19 rotates, i.e. the axis of the pivot pin 20, is always shorter than the distance between said point of engagement of the drive pin 23 and the indicating arm member 19, and the axis around which said drive pin 23 rotates, i.e., the central axis of the shift range select lever shaft 3.

Thereby, as will be more fully explained later, the angular motion of the assembly consisting of the shift range select lever shaft 3, etc., around the axis of the shaft 3, is magnified into a greater angle of rotation of the indicating arm member 19 around the axis of the pivot pin 20.

Thus, in the position shown in FIG. 1, the indicating arm member 19 is aligned behind the range indication aperture 13 which corresponds to the transmission shift range indicating symbol "N", thus indicating that the automatic transmission of the automobile is selected to be in "N" range. Therefore, by the cooperation of the indicating arm member 19 and the symbol display board 9, an indication is provided to the driver of the selected shift range of the automatic transmission.

If now, for example, the transmission range select lever 4 is moved in the downwards direction in FIG. 1, so that the assembly comprising the select lever 4, the select lever shaft 3, the drive pin 23, etc., is rotated generally counterclockwise in FIG. 1 from the state mentioned above, around an axis which is the central axis of the shaft 3, then the drive pin 23 will rotate also around this axis, and will impel the indicating arm member 19, by the point of engagement therebetween moving along the elongated drive slot 24, and, as a result, the indicating arm member 19 will be rotated around an axis which is the central axis of the pivot pin 20, with the result that the indicating arm member 19 will become aligned with some other one of the range indication apertures, i.e., with the range indication aperture 10, 11, or 12, which correspond respectively to the shift range indicating symbols "D", "2", or "L", located to the left of the shift range indicating symbol "N" in FIG. 1, and thereby it will be indicated to the driver that the automatic transmission of the automobile has been shifted into either the "D" range, the "2" range, or the "L" range, according to the amount of movement of the shift range select lever 4.

Similarly, if the shift range select lever 4 is moved in the upwards direction in FIG. 1, so that the assembly comprising the lever 4, the lever shaft 3, the drive pin 23, etc., is rotated generally clockwise in FIG. 1 from the state mentioned above, around said axis which is the central axis of the shaft 3, then the drive pin 23 will rotate also around this axis, and will impel the indicating arm member 19, by the point of engagement therebetween moving along the elongated drive slot 24, and, as a result, the indicating arm member 19 will be rotated around an axis which is the central axis of the pivot pin 20, with the result that the indicating arm member 19 will become aligned with some other one of the range indication apertures, i.e., with the range indication aperture 14 or 15, which correspond respectively to the shift range indicating symbols "R" or "P", located to the right of the transmission range indicating symbol "N" in FIG. 1, and thereby it will be indicated to the driver that the automatic transmission of the automobile has been shifted into either the "R" range or the "P" range, according to the amount of movement of the shift range select lever 4.

By the fact that the distance between the central axis of the shaft 3 and the engagement point between the drive pin 23 and the indicating arm member 19, always, is greater than the distance between said engagement point between the drive pin 23 and the indicating arm member 19, and the central axis of the pivot pin 20, the driven motion of the indicating arm member 19 occurs through a greater pivot angle than does the driving motion of the shift range select lever shaft 3, and thereby the indicating arm member 19 is selectively aligned with one or the other of the range indication apertures 10–15, and the proportional increase of rotational angle is roughly equal to the ratio between the distance between said point of engagement of the indicating arm member 19 and the drive pin 23 and the central axis of the shift range select lever shaft 3, and the distance between said point of engagement of the indicating arm member 19 and the drive pin 23 and the central axis of the pivot pin 20. Thereby, for a given length of the indicating arm member 19, the distance traversed by its indicating end portion remote from the axis of the shaft 3 may be arranged to be larger than would otherwise be the case, if the indicating arm member 19 were rigidly fixed to the shaft 3, and, accordingly, the transmission range indicating symbols "L", "2", "D", "N", "R", and "P", and their corresponding range indication apertures 10, 11, 12, 13, 14, and 15, may be spaced a greater distant apart from one another than would be possible in that abovementioned condition.

Figure 3:
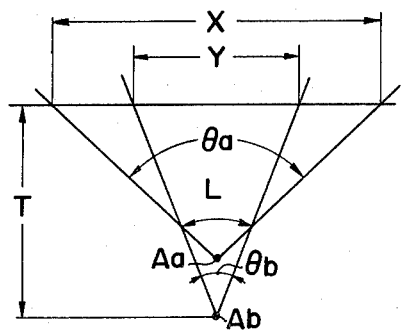
FIG. 3 is a geometrical diagram given for the purpose of explaining the motion of the various components of the first embodiment of the display device of the present invention, shown in FIGS. 1 and 2.

FIG. 3 is a geometrical diagram showing in diagrammatical form the essential principle of the working of the display device which is described above, i.e. of the embodiment of the display device of the present invention. In this diagram, Aa indicates an axis (perpendicular to the plane of the paper) which corresponds to the central axis of the pivot pin 20, while Ab similarly indicates the central axis of the shift range select lever 4. The line indicated by L indicates the trajectory or locus of the point of engagement between the indicating arm member 19 and the drive pin 23. As will be seen, this locus is approximately an arc of a circle around the axis Ab, but is not of course an arc of a circle around the axis Aa, thereby necessitating as described above the provision of the elongated drive slot 24. As will be seen, the angle subtended at the position of the axis Aa by the locus L, designated by "theta-a", is greater than the angle subtended by said locus L at the axis Ab of the select lever 4, designated by "theta-b".

T indicates the average or approximate distance between the central axis of the shift range select lever shaft 3 and the line along which the range indication apertures 10, 11, 12, 13, 14, and 15 are arranged, and it will be seen, according to the above explanation, that, according to the present invention, these range indication apertures 10, 11, 12, 13, 14, and 15 may be spaced along a distance X, which subtends, at the axis Aa, the angle theta-a. While, on the other hand, if, as in the above described prior art, the indicating arm member 19 was directly coupled to the shift range select lever shaft 3, then these range indication apertures 10, 11, 12, 13, 14, and 15 could only be arranged along a shorter distance Y which would subtend the angle theta-b at the axis Ab.

Thereby, the intervals between the shift range indicating symbols "L", "2", "D", "N", "R", and "P", which correspond, respectively, to the range indicating apertures 10, 11, 12, 13, 14, and 15, may be increased, as compared with the above described prior art wherein the indicating arm member 19 is directly driven by the shift range select lever shaft 3, and therefore it is possible to arrange these transmission range indicating symbols on the symbol display board 9 at intervals which are preferable from the point of view of easy reading, and good indicating of the selected shift range of the automatic transmission. Thereby, an easy to read display device is provided.

As a variation of the above described structure, it would be possible for the drive pin 23 and the elongated drive slot 24 to be provided in a reversed arrangement. That is to say, instead of the drive pin 23 rotating with the shift range select lever shaft 3, it could be provided to rotate with the indicating arm member 19, instead; and, corresponding to this, the elongated drive slot 24 would be provided as formed in a member which rotated with the shift range select lever shaft 3. Effectively the same operation of the device would be attained.

Further, the present invention should not be considered as merely limited to an indicating or display device for the selected range of an automatic transmission; it could be used for a wide range of other possibilities. Further, although in the described preferred embodiment the axis around which the indicating arm member 19 rotates, i.e. the axis of the pivot pin 20, is parallel to the axis around which the assembly comprising the shift range select lever 4 and its shaft, etc. rotates, this parallelism is not essential to the present invention, although it provides a preferred embodiment thereof. Further, the present invention should not be conceived of as, in its application to an automatic transmission shift range indication and display device, limited to a display device which is located forward of a semi upright or upright steering column outer tube. Although, because of the limited space available in such a position, the compactness of a display device according to the present invention, without sacrificing readability and distinguishability of the shift range indicating symbols thereof, is particularly helpful for providing a display device which is to be located in such a position.

Yet another modification of the display device according to the present invention may be implemented by omitting the display board for cooperating with the end of the indicating member. In such a case, of course, the user of the device will merely judge, from the position of the end of the indicating member, the value of the quantity which the display device is displaying, without referring this end of the indicator member to any reference symbols. This possibility is not preferred, except in particular instances of construction. However, it is within the bounds of the present invention.

Therefore, although the present invention has been shown and described in terms of some preferred embodiments thereof, and in language more or less specific with regard to structural features thereof, and with reference to the illustrative drawings, it should be understood that in any particular embodiment of the present invention various changes, modifications, and omissions of the form and the detail thereof can be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiments, or of the drawings.

I claim:

1. A display device for displaying an indication of a quantity, comprising:
    an indicator member rotatable within a first range of rotational movement around a first axis; and
    a drive member rotatable around a second axis, different from and substantially parallel to said first axis, within a second range of rotational movement, through an angle corresponding to said quantity, said drive member engaging said indicator member so as to drive said indicator member around said first axis;
    a point of engagement between said drive member and said indicator member describing a locus, with said first and second axes being located on the same side of said locus, as said drive member and said indicator member move through their respective ranges of rotation, the perpendicular distance from any point on said locus to said first axis being shorter than the perpendicular distance from said point to said second axis;
    said indicating member having a portion for displaying the indication of said quantity located at a side of said point of engagement remote from said first axis.

2. A display device according to claim 1, wherein a substantially fixed part of said drive member is engaged with said indicator member.

3. A display device according to claim 2, wherein said indicator member is formed with a slot, and wherein said substantially fixed part of said drive member is engaged with the sides of said slot.

4. A display device according to claim 3, wherein said substantially fixed part of said drive member is a driving pin.

5. A display device according to any one of claims 1-4, further comprising a display plate with symbols inscribed thereon, said display plate cooperating with said indicator member so as to pick out, selectively, one of said symbols.

6. A display device for displaying an indication of the shift range in which an automatic transmission comprised in a vehicle is set, comprising:
    an indicator member rotatable within a first range of rotational movement about a first axis; and
    a drive member rotatable about a second axis, different from and substantially parallel to said first axis, within a second range of rotational movement, through an angle corresponding to the set range of said automatic transmission, said drive member engaging said indicator member so as to drive said indicator member about said first axis;
    a point of engagement between said drive member and said indicator member describing a locus, with said first and second axes being located on the same side of said locus, as said drive member and said indicator member move through their respective ranges of rotation, the perpendicular distance from any point on said locus to said first axis being shorter than the perpendicular distance from said point to said second axis;
    said indicating member having a portion for displaying the indication of said shift range located at a side of said point of engagement remote from said first axis.

7. A display device for displaying an indication of the shift range in which an automatic transmission comprised in a vehicle which also comprises a shift range select lever is set, comprising:
    an indicator member rotatable within a first range of rotational movement about a first axis; and
    a drive member, fixedly coupled to said shift range select lever and rotatable about a second axis different from said first axis and substantially parallel to said first axis, within a second range of rotational movement, through an angle corresponding to the set range of said automatic transmission, said drive member engaging said indicator member so as to drive said indicator member about said first axis;
    a point of engagement between said drive member and said indicator member describing a locus, with said first and second axes being located on the same side of said locus, as said drive member and said indicator member move through their respective ranges of rotation, the perpendicular distance from any point on said locus to said first axis being shorter than the perpendicular distance from said point to said secod axis;
    said indicating member having a portion for displaying the indication of said shift range located at a side of said point of engagement remote from said first axis.

8. A display device for displaying an indication of the shift range in which an automatic transmission comprised in a vehicle which also comprises a shift range select lever and a steering column outer tube is set, comprising:
    an indicator member rotatable within a first range of rotational movement about a first axis; and
    a drive member, fixedly coupled to said shift range select lever and rotatable about a second axis different from said first axis and substantially parallel to said first axis and to said steering column outer tube and generally upright in the vehicle and forward with respect to the body thereof of said steering column outer tube central axis, within a second range of rotational movement, through an angle corresponding to the set range of said automatic transmission, said drive member engaging said indicator member so as to drive said indicator member about said first axis;
    a point of engagement between said drive member and said indicator member describing a locus, with said first and second axes being located on the same side of said locus as said drive member and said indicator member move through their respective ranges of rotation, the perpendicular distance from any point on said locus to said first axis being shorter than the perpendicular distance from said point to said second axis;

said indicating member having a portion for displaying the indication of said shift range located at a side of said point of engagement remote from said first axis.

* * * * *